United States Patent [19]

Sakamoto

[11] Patent Number: 5,200,685
[45] Date of Patent: Apr. 6, 1993

[54] ADAPTER FOR EXTERNAL BATTERY AND BATTERY SYSTEM

[75] Inventor: Kenji Sakamoto, Ora, Japan

[73] Assignee: Sanyo Electric Co., Ltd., Osaka, Japan

[21] Appl. No.: 734,937

[22] Filed: Jul. 24, 1991

[30] Foreign Application Priority Data

Jul. 31, 1990 [JP] Japan .................................. 2-203255

[51] Int. Cl.$^5$ .............................................. H02J 7/00
[52] U.S. Cl. ........................................... 320/2; 307/66
[58] Field of Search ......................... 320/2, 6, 8, 9, 10, 320/15; 307/64, 66

[56] References Cited

U.S. PATENT DOCUMENTS

| | | | |
|---|---|---|---|
| 4,315,162 | 2/1982 | Ferguson | 307/66 |
| 4,431,245 | 2/1984 | Jigamian et al. | 339/49 B |
| 4,490,667 | 12/1984 | Mullersman | 320/48 |
| 4,709,201 | 11/1987 | Schaefer et al. | 320/2 |
| 4,922,178 | 5/1990 | Matuszewski et al. | 320/2 |
| 4,965,462 | 10/1990 | Crawford | 307/66 |

OTHER PUBLICATIONS

Panasonic, "Operating Instructions for a Plug-In AC Adaptor", May, 1982.
Sony, "DC Pack/Battery Charger (DCP-80)", 1984.
Canon, "Accessories That Match Your Video System to Your Shooting Style", 1987.

*Primary Examiner*—Steven L. Stephan
*Assistant Examiner*—Kristine L. Peckman
*Attorney, Agent, or Firm*—Spensley Horn Jubas & Lubitz

[57] ABSTRACT

An adapter for selectively connecting an external battery which is used as a power source of a portable notebook type computer to the computer or to a charger, and an external battery system for controlling the connection between the adapter, the computer and the charger. The external battery is connectable to the adapter, and the adapter is connected to either the charger or the computer. A diode for selectively regulating either the direction for charging the external battery or the direction for introducing the power from the external battery is provided within the adapter. The adapter, the charger and the computer are selectively connected with each other by a common cable.

13 Claims, 3 Drawing Sheets

ADAPTER FOR EXTERNAL BATTERY AND BATTERY SYSTEM

BACKGROUND OF THE INVENTION

1. Field of the Invention

The present invention relates to a spare battery unit which is chargeable so as to supply an electric power to battery-driven machines such as a notebook type personal computer and, more particularly, to an adapter for an external battery and a battery system including such an adapter.

2. Description of the Related Art

Various battery-driven machines which utilize a chargeable battery as their power source have become widespread.

An example of such machines is a notebook type personal computer. A notebook type personal computer is advantageous in that it is portable because it is driven by a battery removably installed in the interior of the machine without the need for connection with the mains power. Before the power of the battery is consumed, the battery is charged by a charger, thereby maintaining the function of the battery.

A conventional battery will now be explained with reference to FIG. 3.

A personal computer 1 is provided therewithin with an internal battery 2 which is removable and chargeable, and the electric power of the battery 2 is utilized for various operations. When the internal battery 2 is charged, a predetermined DC is supplied from a DCIN terminal 3 and introduced to the internal battery 2 so as to charge it.

For this purpose, the DCIN terminal 3 is connected to a DC cable 4, and the DC cable 4 is connected to a plug 6 through an AC adapter/charger 5.

The AC power (usually AC 100 to 240 V) from the plug 6 is converted into a predetermined DC power (e.g., DC 12 V) by the AC adapter/charger, and input to the DCIN terminal 3 of the personal computer 1 through the DC cable 4, thereby charging the internal battery 2.

In this way, by charging the internal battery 2 with a predetermined frequency, it is possible to maintain the power of the internal battery 2 and to drive the personal computer by utilizing the power.

However, since the capacity of the internal battery 2 is limited, the computer can be operated for about 2 hours at most without recharging the internal battery. Although it is possible to prolong the duration of continuous use of the computer by increasing the capacity of the internal battery 2, since the weight of the personal computer 1 is thereby increased, there is a limit to increases in the capacity of the internal battery 2.

In order to permit continuous use of the computer for a long time use without charging while maintaining the light weight of the personal computer 1, a battery identical to the internal battery 2 may be provided as a spare battery which replaces the internal battery 2 after a predetermined time has passed.

However, during the period when the batteries are being changed, the power supply to the personal computer 1 is zero, so that the data and the like which are stored in a RAM or the like of the personal computer 1 are lost. To prevent this, a battery for backing up the RAM is provided in the personal computer 1 separately from the internal battery 2 so as to save the data and the like in a memory such as a magnetic disk which can store the data before the power supply to the personal computer is cut off for the purpose of exchanging the batteries.

This is, however, also disadvantageous in that the system for providing the backup battery within the personal computer 1 requires an additional device, which occupies a considerable space in the personal computer 1, increases the weight of the computer and leads to an increase in cost.

Especially, since the backup battery is not operated for any significant period of time, it is inefficient to provide it within the personal computer 1.

In addition, it is troublesome for the user to save the data and the like in a magnetic disk or the like before exchanging the batteries and to restore the data after they are exchanged.

SUMMARY OF THE INVENTION

Accordingly, it is an object of the present invention to eliminate the above-described problems in the related art and to provide an adapter for an external battery and a battery system which are capable of efficiently utilizing an external battery.

To achieve this aim, an adapter for an external battery according to the present invention comprises: a battery connector for connecting the adapter to an external battery which is chargeable; an external device connector including a power output terminal which is connected to the battery connector so as to output the power from the external battery, and a power input terminal for receiving a current for charging the external battery; an output diode which is provided in a current path between the power output terminal and the battery connector so as to apply a current from the external battery to the power output terminal; and a charging diode which is provided between the power input terminal and the battery connector so as to apply a current from the power input terminal to the external battery.

A battery system according to the present invention comprises:

an adapter for an external battery; and a computer including a power input terminal for receiving a power to be supplied to a load, a charging current receiving means for receiving a current for charging an internal battery, and a diode disposed in a current path for supplying the current from the internal battery to the load so as to check a reverse flow;

the power output terminal of the adapter for an external battery being connected to the power input terminal of the computer so as to enable a power to be supplied from the external battery to the computer; and the power input terminal of the adapter for an external battery being connected to the power output terminal of a charger so as to enable the external battery to be charged.

According to the present invention, it is possible to output the power of the external battery from the power output terminal and to receive the charged power of the external battery from the input terminal by connecting the adapter for an external battery to the external battery.

By connecting the adapter for an external battery to the charger, it is possible to charge the external battery.

It is also possible to supply the power of the external battery to the machine by connecting the adapter for an external battery to the computer.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
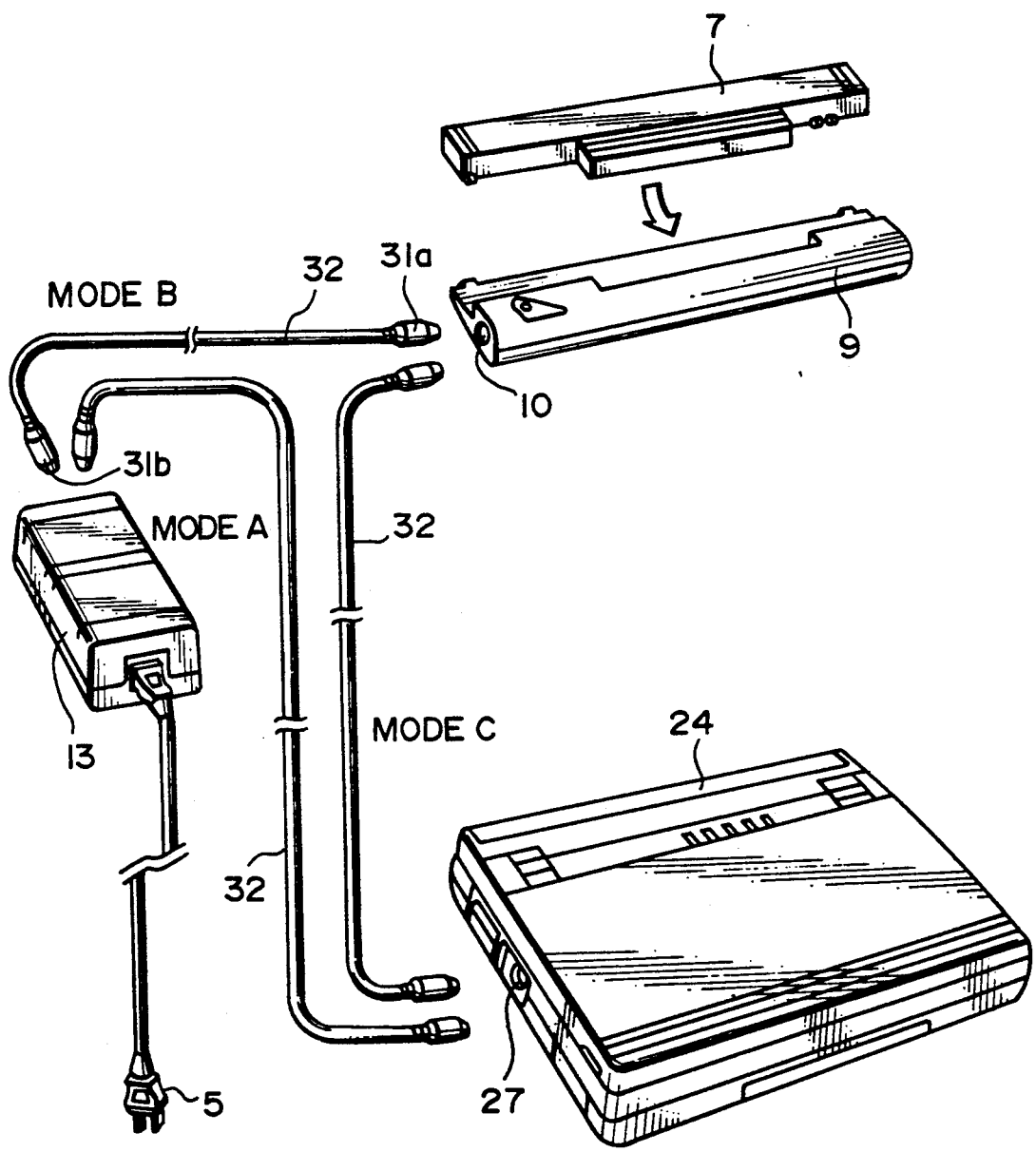
FIG. 1 is a perspective view of the external appearance of an embodiment of an adapter for an external battery and a battery system, showing three connection modes of the adapter with a charger and a computer.

FIG. 1 shows an embodiment of an adapter for an external battery according to the present invention and an external battery which is connected to the adapter. The connection between the adapter, a charger and a computer can be established by one cable in three modes by switching, as shown in FIG. 1.

In FIG. 1, an external battery 7 is chargeable and it is formed into a portable battery power pack. For example, a battery MBC-18NBAT, produced by Sanyo Electric Co., Ltd. is preferred.

In order to connect the external battery 7 to a charger or a computer, an adapter 9 for an external battery which is characteristic of the present invention is provided. The adapter 9 incorporates diodes for selectively restricting the connection circuits and the current paths, as will be described later. The adapter 9 is also provided with a connector for electrically connecting the adapter 9 to the battery 7 and another connector for electrically connecting the adapter 9 to an external charger or a computer, as will be described later. In FIG. 1, an external device connector is represented by the numeral 10.

The external battery 7 shown in FIG. 1 constitutes an auxiliary power source with respect to a portable notebook type computer. Power is supplied from the external battery 7 to a notebook type computer 24 through a cable 32 via the adapter 9. The notebook type computer 24 is, for example, a portable computer of MBC-18NB series, produced by Sanyo Electric Co., Ltd. An internal battery for normally supplying power to the computer is provided within the computer 24. The adapter 9 of the present invention allows the external battery 7 to effectively cooperate with the internal battery.

A charger 13 is provided so as to selectively charge either the external battery 7 or the internal battery provided within the computer 24 through the common cable 32. The charger 13 receives AC power from a mains power source through a plug 5, rectifies the AC power current and lowers the voltage thereof. Thereafter, the charger 13 supplies current to the external battery 7, or to the internal battery within the computer 24 or the group of devices through the cable 32 as a charging or driving current.

As will be described later, according to the present invention, since the adapter 9 for an external battery has a characteristic connecting structure and characteristic current paths, it is possible to connect the adapter 9 to the computer 24 and the charger 13 in three different charging or power supply modes by using the common cable 32. As is clear from FIG. 1, the common cable 32 has two four-terminal 31a and 31b, each at a respective end thereof.

Figure 2:
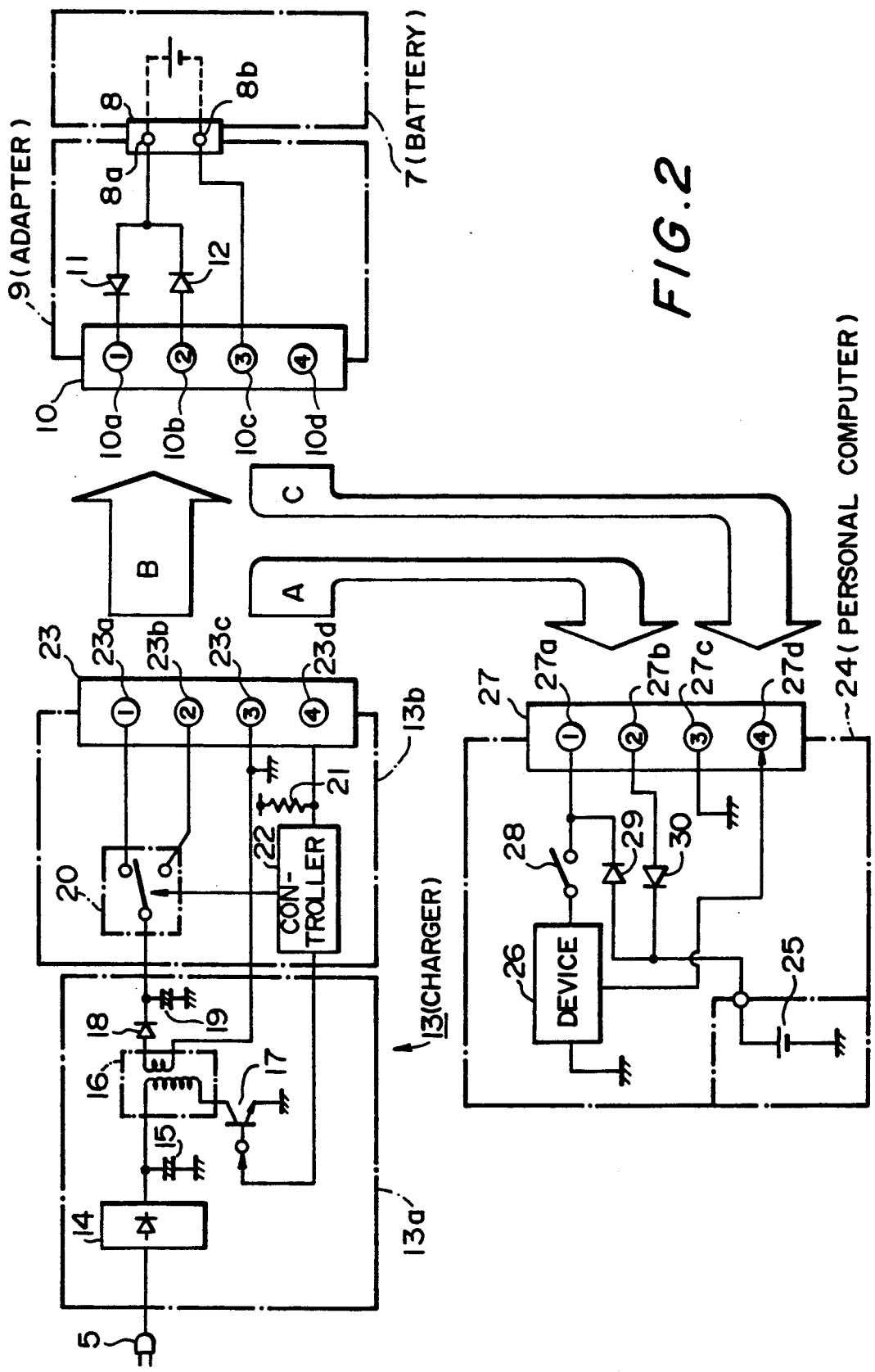
FIG. 2 is a circuit diagram of the power circuitry within the adapter for an external battery, the charger and the computer shown in FIG. 1.
Figure 3:
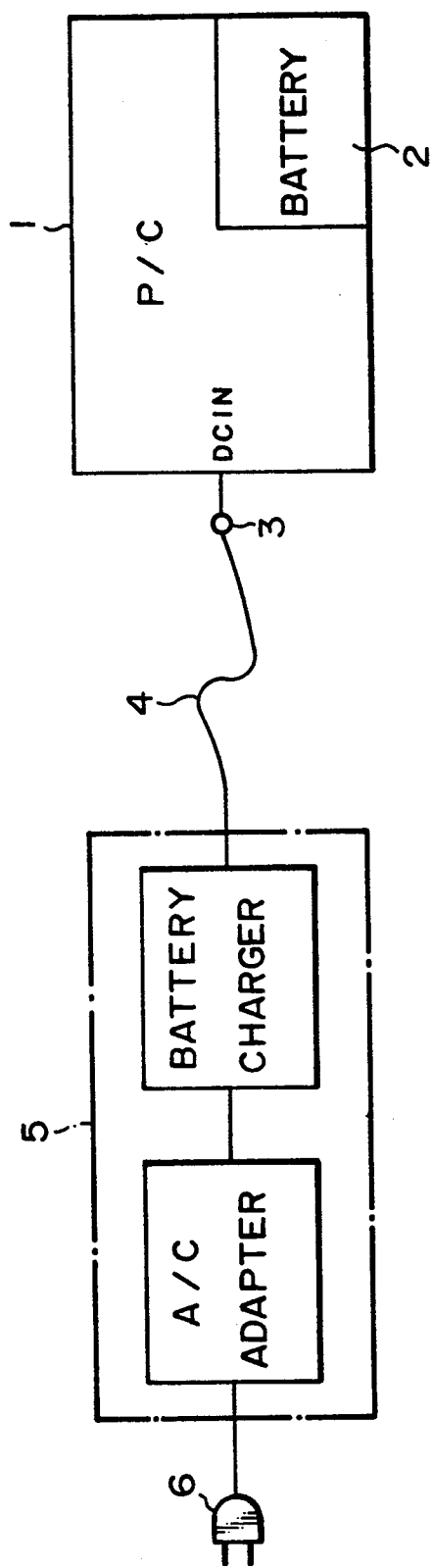
FIG. 3 is an explanatory view of a conventional adapter in the state of charging a battery within a computer.

FIG. 2 shows the power circuitry of the adapter 9 having a structure characteristic of the present invention, the charger 13 and the notebook type computer 24.

The external battery 7 is a chargeable battery which has the same ability as the internal battery for supplying power necessary for driving the personal computer. The external battery 7 is connected to the adapter 9 for an external battery through the battery connector 8 of the adapter 9. The positive pole of the external battery 7 is connected to the positive-pole terminal 8a of the battery connector 8, and the negative pole of the external battery 7 is connected to the negative-pole terminal 8b of the battery connector 8.

The adapter 9 for an external battery has an external device connector 10, and the connector 10 has four terminals 10a to 10d. The first terminal 10a and the second terminal 10b are connected to the positive-pole terminal 8a of the connector 8 through a diode 11 for checking the inflow of a current and a diode 12 for checking the outflow of a current, respectively. The third terminal 10c (through terminal) is connected to the negative-pole terminal (common terminal) 8b, and the fourth terminal 10d is open.

If a load is connected between the first terminal 10a and the third terminal 10c, power is supplied from the external battery 7 to the load through the diode 11. On the other hand, if the second terminal 10b and the third terminal 10c are connected to a DC supply source, it is possible to charge the external battery 7 through the diode 12.

In FIG. 2, the charger 13 is composed of an AC adapter 13a for AC/DC conversion and a charge controller 13b for controlling the output DC power. The AC adapter 13 includes a rectifier 14 which is connected to the plug 5, a capacitor 15 for smoothing the output of the rectifier 14 and a voltage-drop transformer 16 for lowering the smoothed DC voltage. A switching transistor 17 supplies a predetermined control signal to the primary coil of the voltage-drop transistor 16, and a diode 18 and a capacitor 19 are used to obtain a predetermined DC power at the output of the secondary coil of the voltage-drop transformer 16.

The AC power (usually AC 100/110 V) supplied from the plug 5 is therefore output as a predetermined DC power which is determined by the ON/OFF of the switching transistor 17. In other words, the smaller the duty ratio of the pulsating control signal which controls the ON/OFF of the switching transistor 17, the smaller the output power of the transistor 17, so that it is possible to control the output power by the ON/OFF control of the switching transistor 17.

The charge controller 13b is composed of a changeover switch 20, a connector 23 having four terminals 23a to 23d, a controller 22 and a resistor 21 for pulling up the potential of the line connecting the terminal 23d and the controller 22. The input terminal of the changeover switch 20 is connected to the DC power output terminal of the AC adapter 13a, while one output terminal is connected to the terminal 23a of the connector 23 and the other output terminal is connected to the terminal 23b. The DC output from the AC adapter 13a is therefore output from either the terminal 23a or the terminal 23b in accordance with the switching operation of the changeover switch 20.

As will be described later, when the charger 13 is connected to the computer 24, it is possible to determine whether the power of the charger 13 should drive directly each device of the computer 24 or charge the internal battery.

The controller 22 controls the switching operation of the changeover switch 20 and the ON/OFF operation of the switching transistor 17 in the AC adapter 13a in accordance with the signal supplied from the computer 24 to the controller 22 through the terminal 23d.

In other words, when the controller 22 judges from the signal input from the computer 24 to the terminal 23d that the personal computer 24 is being operated, the controller 22 connects the changeover switch 20 to the terminal 23a and so controls the ON/OFF operation of the switching transistor 17 that power having a predetermined voltage is output from the terminal 23a. As a result, the computer 24 is driven by the charger 13.

On the other hand, when the controller 22 judges from the signal input from the computer 24 to the terminal 23d that the personal computer 24 is in an inoperative state, the controller 22 connects the changeover switch 20 to the terminal 23b and so controls the ON/OFF operation of the switching transistor 17 that power having a constant current is output from the terminal 23b. As a result, the internal battery within the computer 24 is charged.

The terminal 23c is connected to the grounding side of the voltage-drop transformed 16 of the AC adapter 13a.

The personal computer 24 includes a removable internal battery 25, a load 26 for conducting various operations of the personal computer, and a connector 27 having four terminals 27a to 27d for connecting the computer 24 to an external device. The positive pole of the internal battery 25 and the terminal 27a are connected to the load 26 such as CPU, memory, display, hard disk drive and floppy disk drive through a power switch 28, so that it is possible to supply the power from the internal battery 25 or the terminal 27a to the load 26. A diode 29 for preventing a current from flowing to the internal battery 25 is provided between the internal battery 25 and the path connecting the power switch 28 and the terminal 27a. All the currents from the terminal 27a are therefore used to drive the computer 24 and the internal battery 25 is inhibited from being charged.

Thus, in the present invention, while the charger 13 is driving the computer 24, the driving of the computer 24 at a constant voltage is not impaired by the current for charging the internal battery 25.

The terminal 27b is connected to the positive pole of the internal battery 25 through a diode 30, thereby enabling the internal battery 25 to be charged by the current supplied from the charger 13 through the terminal 27b.

At this time, the charger 13 outputs a constant current and charges the internal battery 25 by a constant current in accordance with the charged state of the internal battery 25.

A power ON/OFF detection signal is output from the load 26 to the terminal 27d, and the information about which charging mode should be selected is output from the terminal 27d. The terminal 27c is a grounding terminal (0 V common terminal).

As described above, according to the present invention, the adapter 9 for an external battery, the charger 13 and the personal computer 24 have the common four-terminal connectors 10, 23 and 27, respectively. It is therefore possible to connect each other by the DC cable 32 having the four-terminal connectors 31a, 31b at the respective ends in a desired mode, as shown in FIG. 1.

The adapter of the present invention and the charger and the computer which are connected to the adapter have the above-described power circuitry. Three charging and driving modes of the computer using the adapter 9 of the present invention will be explained in the following.

Mode A (the computer 24 is driven and the internal battery 25 is charged by the charger 13).

In this mode, the computer 24 is connected to the charger 13 by the cable 32. In the mode A, a mode is further selected from two different power supply modes depending upon whether or not the computer 24 is being operated.

In a first mode, the computer 24 is being operated. The charger 13 detects the operative state of the computer 24 and supplies power having a constant voltage to the computer 24.

In a second mode, the computer 24 is in an inoperative state, and the computer 24 requires the charger 13 to supply power having a constant current for charging the internal battery 25.

When the charger 13 is connected to the personal computer 24 by the DC cable 32, the load 26 outputs an operative state detection signal of [H] or [L] from the terminal 27d in accordance with the state of the power switch 28. For example, when the power switch 28 is ON, the load 26 outputs a signal of [L] which requires the supply of an operating current to the load 26. On the other hand, when the power switch 28 is OFF, the load 26 outputs a signal of [H] which requires the internal battery 25 to be charged.

The detection signal of [H] or [L] is supplied to the controller 22 through the terminal 23d of the charge controller 13b. The controller 22 operates the transistor 17 and the switch 20 in accordance with the detection signal. If the detection signal indicates the demand for an operating current when the power switch 28 is ON (i.e, a detection signal of [L]), the controller 22 switches the connection of the changeover switch 20 from the terminal 23b to the terminal 23a, controls the switching transistor 17 so as to output a constant voltage and outputs power with a constant voltage from the terminal 23a. The personal computer 24 receives the constant voltage from the terminal 27a, and the load 26 is operated by the power of the constant voltage.

On the other hand, if the detection signal obtained at the terminal 23d indicates the demand for a charging current when the power switch 28 is OFF (i.e, a detection signal of [H]), the controller 22 switches the connection of the changeover switch 20 from the terminal 23a to the terminal 23b, controls the switching transistor 17 so as to output a constant current and outputs power with a constant current from the terminal 23b. Since the power with a constant current is supplied to the personal computer 24 from the terminal 27b, it is supplied to the internal battery 25 through the diode 30, thereby charging the internal battery 25.

Mode B (the external battery 7 is charged by the charger 13)

In the mode B, charging power is supplied from the charger 13 to the battery 7 in order to fully charge the external battery 7. The adapter 9 of the present invention is used for charging. The charger 13 outputs power having a constant current for charging the external battery 7. When the charger 13 is connected to the adapter 9 for an external battery by the DC cable 32, which is used in common in each mode, since the terminal 10d of the adapter 9 for an external battery is open, the level of the signal obtained at the terminal 23d becomes [H] by virtue of the pull-up resistor 21. The controller 22 judges that there is a demand for charging, switches the connection of the switch 20 from the terminal 23a to the terminal 23b, and simultaneously supplies a constant current control signal to the switching transistor 17. A constant current is therefore output from the terminal 23b. A constant current is thus obtained at the terminal 10b of the adapter 9 for an external battery, and it is supplied to the external battery 7 through the diode 12, thereby charging the external battery 7.

Mode C (the computer 24 is driven by the external battery 7)

In the mode C, the power of the external battery 7 is directly supplied to the load 26 of the computer 24 through the adapter 9, and the external battery 7 is used either in place of or in cooperation with the internal battery 25. In the mode C, it is possible to directly supply the power of the external battery 7 to the load 26 without the need for removing the internal battery 25 from the computer 24. It is also possible to remove the internal battery 25 from the computer 24 for charging the internal battery 25 during this auxiliary power supply. The backing up of the memory for data is therefore dispensed with, which is necessary at the time of exchanging the live batteries in the prior art.

When the adapter 9 for an external battery is connected to the personal computer 24 by the DC cable 32, the current from the external battery 7 is supplied to the terminal 27a of the personal computer 24 through the diode 11 and the terminal 10a. The power is therefore supplied to the load 26 through the power switch 28, and the load 26 operates by the power of the external battery 7.

At this time, the power of the internal battery 25 within the personal computer 24 is also supplied to the load 26 through the diode 29 and the power switch 28. It is therefore possible to operate the personal computer 24 by utilizing the power from both external battery 7 and internal battery 25. If each of the external battery 7 and the internal battery 25 has a capacity for continuous use for 2 hours, this embodiment allows the personal computer 24 to be continuously used for 4 hours, which is the sum of the capacities of the batteries 7 and 25. In a general notebook type personal computer, if it is usable for 4 consecutive hours, there is almost no trouble in ordinary use. If the external battery 7 and the adapter 9 for an external battery are carried together with the personal computer 24, sufficiently continuous use of the personal computer 24 is possible without charging.

As described above, according to the present invention, since each member is connected by the DC cable 32 which has connectors 31 at the respective ends, the system is simplified.

If the internal battery 25 is removed while power is supplied from the external battery 7, since the power from the external battery 7 is supplied to the personal computer 24, the data in load 26 such as a RAM or the like are not lost. It is therefore possible to change the internal batteries 25 without the need for the backing-up operation.

If a plurality of batteries are carried and the internal batteries 25 are exchanged while the external battery 7 is connected to the personal computer 24, it is possible to further prolong the time enabling the continuous use of the computer 24. It is also possible to alleviate problems at the time of exchanging the deteriorated internal battery.

In this embodiment, the charger 13 switches between the adapter mode and the charging mode in accordance with the detection signal from the personal computer 24 in the mode A. Alternatively, it is possible to provide a manual switch for switching modes in the charger 13. In this case, the number of terminals at both ends of the connectors may be reduced to 3, and a 3-pin DC cable may be used.

As described above, according to an adapter for an external battery and a battery system of the present invention, it is possible both to charge an external battery and to supply power from the external battery by utilizing one adapter for an external battery, so that efficient use of the external battery is enabled. It is also possible without increasing the weight of the personal computer to prolong the time enabling the continuous use of the computer without charging.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A system comprising an adapter for a chargeable external battery in combination with a charger, said adapter being provided for selectively connecting the chargeable external battery to a computer or the charger, the charger comprising a constant current source, and the adapter comprising:
   A) a battery connector having a common terminal for connecting the adapter to the chargeable external battery;
   B) an external device connector including a through terminal which is connected to the common terminal of the battery connector, a power output terminal for outputting power from the external battery, and a power input terminal which is independent of the power output terminal for receiving a current from the constant current source for charging the external battery;
   C) a first diode provided in a current path between the power output terminal and the battery connector so as to selectively conduct current from the external battery only to the power output terminal; and
   D) a second diode provided between the power input terminal and the battery connector so as to selectively conduct current from the power input terminal only to the external battery.

2. A system according to claim 1, wherein the external device connector has a terminal structure for receiving a cable which connects the adapter to the computer or the charger.

3. A battery system comprising:
   a chargeable external battery;
   a battery adapter for supplying a charging current to the external battery and outputting a current from the external battery;
   a computer including a chargeable internal battery removably installed therewithin and a load for conducting various operations; and an AC/DC adapter including a power output terminal for supplying the charging current in accordance with power from an AC power source;

the battery adapter including:

a battery connector having a common terminal for connecting the battery adapter to the chargeable external battery;

an external device connector having a through terminal which is connected to the common terminal of the battery connector, a power output terminal for outputting power from the external battery, and a power input terminal for receiving the charging current for the external battery;

a first diode provided in a current path between the power output terminal and the battery connector so as to selectively apply current from the external battery only to the power output terminal; and a second diode provided between the power input terminal and the battery connector so as to selectively apply current from the power input terminal only to the external battery;

the computer including a power input terminal for receiving power to be supplied to the load;

a charging current receiving means for receiving a current for charging the internal battery; and a third diode disposed in a current path for supplying current from the internal battery to the load so as to prevent a reverse flow of current from the load to the internal battery;

the power output terminal of the battery adapter being connectable to the power input terminal of the computer so as to enable power to be supplied from the external battery to the computer; and the power input terminal of the battery adapter being connectable to the power output terminal of the AC/DC adapter so as to enable the external battery to be charged.

4. A battery system according to claim 3, wherein the adapter is connected to the charger or the computer by a common cable.

5. A battery system according to claim 4, wherein the common cable is composed of a four-terminal cable including two power terminals, a grounding terminal and a computer power ON/OFF detection signal terminal.

6. A battery system according to claim 3, wherein the AC/DC adapter includes a terminal for outputting power having a constant voltage, a terminal for outputting power having a constant current and a switch for changing from one terminal to the other.

7. A battery system according to claim 6, wherein the AC/DC adapter includes a terminal for receiving a computer power ON/OFF detection signal, and a controller for switching the connection of the switch from the terminal for outputting power having a constant voltage to the terminal for outputting power having a constant current, or vice versa in accordance with the detection signal supplied from the terminal for receiving a computer power ON/OFF detection signal.

8. A battery system according to claim 7, wherein the terminal for receiving a computer power ON/OFF detection signal is connected to a pull-up resistor with one end thereof connected to a power source, and the controller constantly switches the connection of the switch to the terminal for outputting power having a constant current when the terminal for receiving a computer power ON/OFF detection signal terminal is open.

9. A system according to claim 2, wherein said charger is constituted by an AC/DC adapter for converting AC power from a mains power source to power in the form of a DC voltage, a charge controller for converting the DC voltage to a constant voltage output or a constant current output, and a connector which is capable of connecting the charger to the cable for supplying these outputs to an external device.

10. A system according to claim 9, wherein the AC/DC adapter includes a switching transistor which is connected to a primary coil of a voltage-drop transformer so as to adjust the power in the form of a DC voltage in accordance with the ON/OFF duty ratio of the switching transistor.

11. A system according to claim 10, wherein the charge controller includes a controller for controlling the switching transistor in accordance with a computer power ON/OFF detection signal.

12. A battery system according to claim 3, wherein the computer includes:

a first input terminal for conducting power with a constant voltage from said AC/DC adapter to the load;

a second input terminal for conducting power with a constant current from said AC/DC adapter to said internal battery;

a grounding terminal; and an output terminal for outputting a signal representing the operating state of the computer;

this group of terminals being connectable to a common cable.

13. A battery system according to claim 12, wherein a third diode for checking a reverse current is provided in a current path between the first input terminal and the internal battery.

* * * * *